United States Patent [19]

Cina et al.

[11] Patent Number: 5,429,311

[45] Date of Patent: * Jul. 4, 1995

[54] PROCESS OF RECYCLING OF DISPOSABLE DIAPERS AND THE MACHINE COMPONENTS THEREOF

[75] Inventors: Yaron Cina, Tel-Aviv; Eitan Parag, Ramat-Yishai, both of Israel

[73] Assignee: DIA TEC Recycling Technologies, Ltd., Ramat Hasharon, Israel

[ * ] Notice: The portion of the term of this patent subsequent to Jun. 21, 2011 has been disclaimed.

[21] Appl. No.: 212,935

[22] Filed: Mar. 15, 1994

Related U.S. Application Data

[63] Continuation-in-part of Ser. No. 886,899, May 22, 1992, Pat. No. 5,322,225.

[51] Int. Cl.⁶ .............................................. B02C 19/12
[52] U.S. Cl. ........................................ 241/14; 241/21; 241/38; 241/77; 241/DIG. 38
[58] Field of Search ................ 241/14, 21, 38, 77, 241/DIG. 38, 23, 37.5

[56] References Cited

U.S. PATENT DOCUMENTS

| | | | |
|---|---|---|---|
| 3,645,456 | 2/1972 | Grafstrom et al. | 241/29 |
| 3,807,296 | 4/1974 | Eck | 100/74 |
| 4,303,501 | 12/1981 | Steffens | 209/2 |
| 4,500,040 | 2/1985 | Steffens | 241/14 |
| 4,592,115 | 6/1986 | Holmstrom | 19/82 |
| 4,990,244 | 2/1991 | Anderson | 209/2 |
| 5,104,047 | 4/1992 | Simmons | 241/20 |
| 5,197,678 | 3/1993 | Trezek et al. | 241/21 |
| 5,322,225 | 6/1994 | Cina | 241/14 |

FOREIGN PATENT DOCUMENTS

| | | |
|---|---|---|
| 2703063 | 7/1978 | Germany . |
| 2704035 | 8/1978 | Germany . |
| 3214294 | 1/1984 | Germany . |
| 8303765 | 1/1985 | Sweden . |

*Primary Examiner*—John Husar
*Attorney, Agent, or Firm*—Browdy and Neimark

[57] ABSTRACT

A process for recovering the cellulose flock component of used disposable sanitary non-woven cellulose articles, especially diapers having also a plastics component and a superabsorbent polymer component, comprising: separating the cellulose flock component from the plastics component; disintegrating the cellulose flock component in water into cellulose fibers and separating them from the water containing the superabsorbent polymer component and other waste, by selectively collecting the cellulose fibers onto a rough surface; disposing the water, effluent and separately compacting the separated cellulose fibers and the separated plastics component prior to their discharge. The invention also provides an apparatus for carrying out the process.

30 Claims, 12 Drawing Sheets

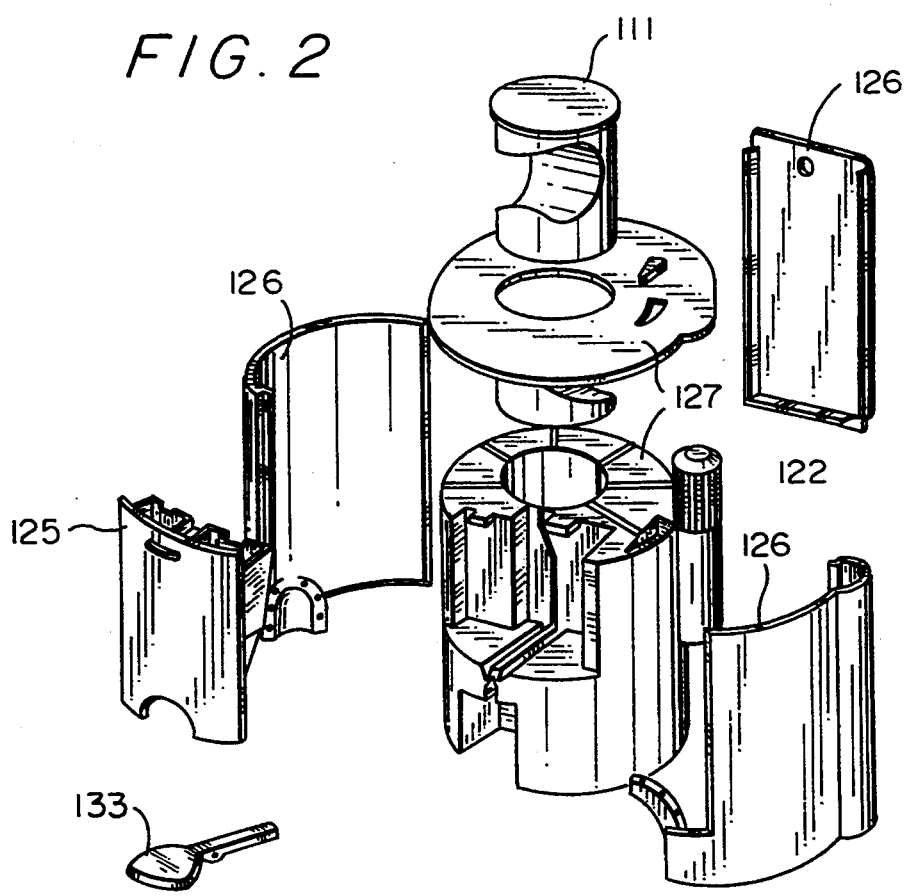

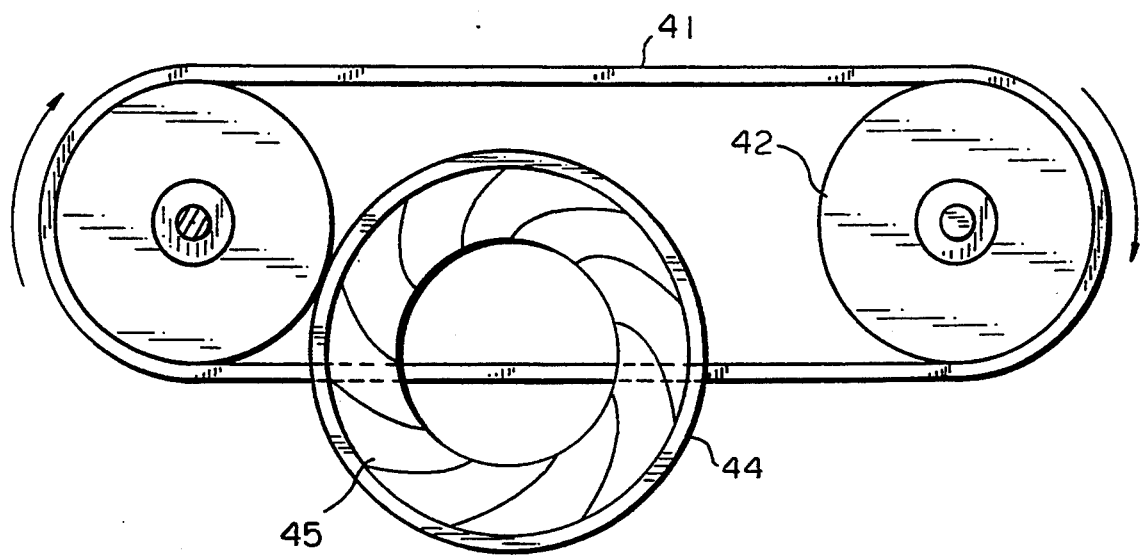
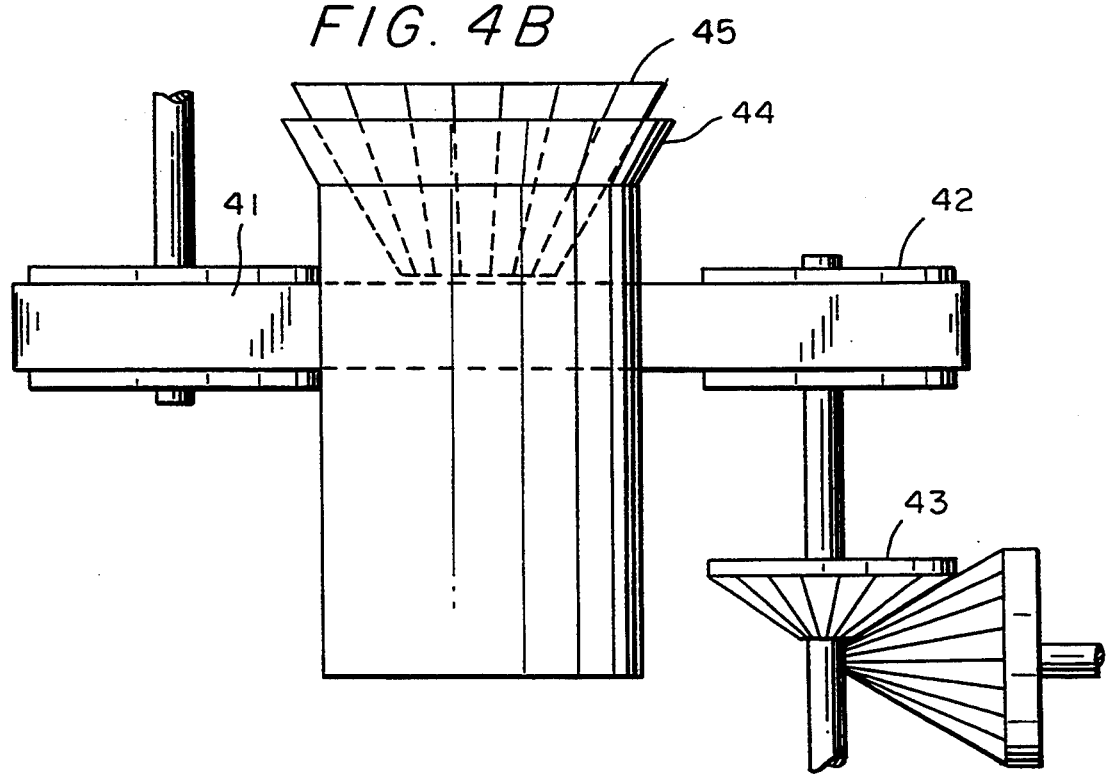

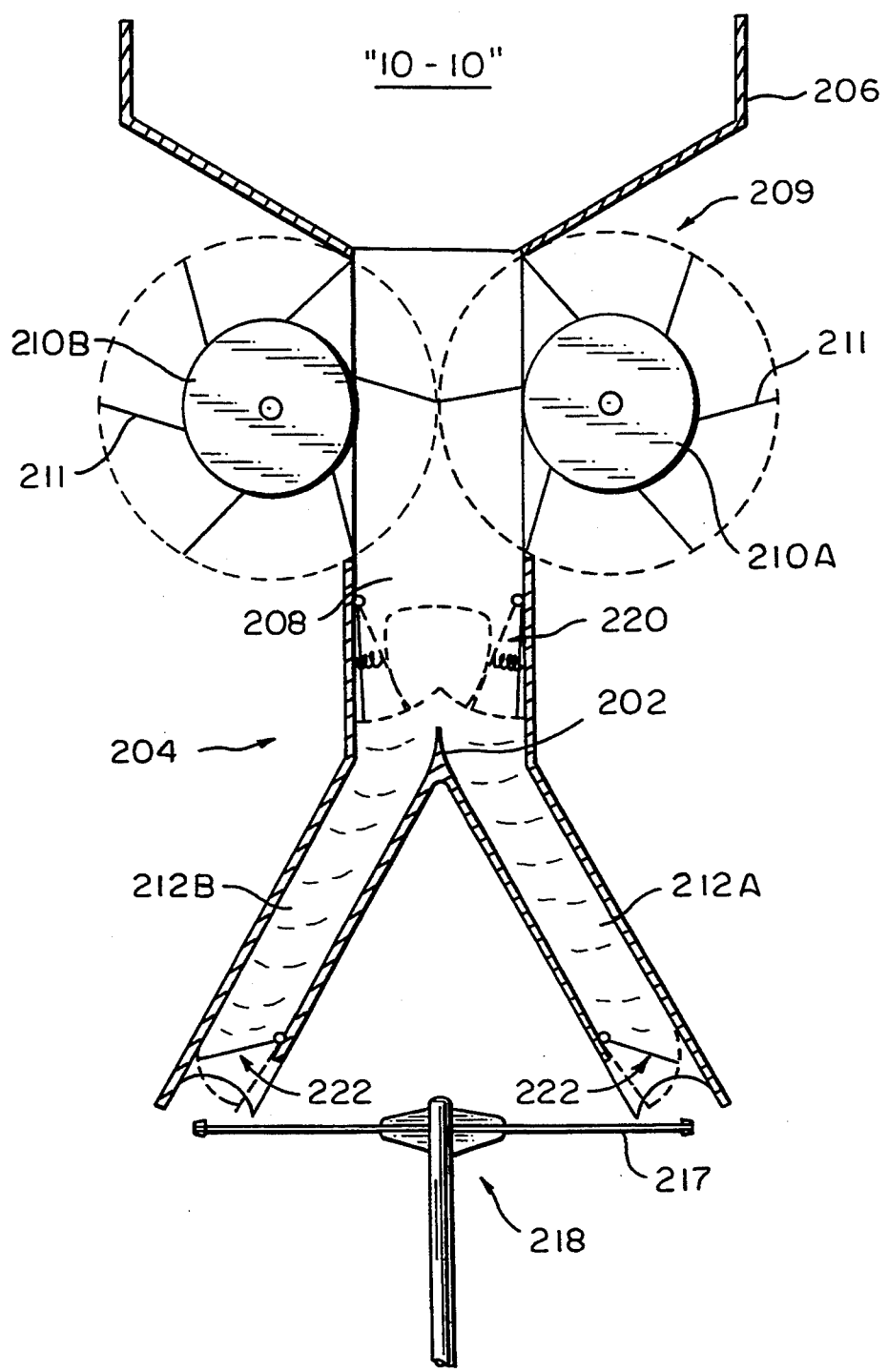

PROCESS OF RECYCLING OF DISPOSABLE DIAPERS AND THE MACHINE COMPONENTS THEREOF

This is a continuation-in-part of U.S. Ser. No. 07/886,899 filed May 22, 1992, now U.S. Pat. No. 5,322,225.

BACKGROUND OF THE INVENTION

This invention relates to processes and apparatus for garbage recycling, more particularly, to a process and apparatus for processing used disposable diapers and other sanitary non-woven cellulose articles, to recover therefrom raw materials, such as cellulose and plastics in compacted form, which raw materials can be converted into useful products. The invention is particularly aimed at recycling of used disposable diapers and separating the cellulose contents into a dry and compact product, and the plastic component into a reusable raw material.

For the sake of simplicity, reference will sometimes be made hereinafter to a diapers, but it should be understood that this term may equally refer to any other sanitary non-woven cellulose articles.

DESCRIPTION OF THE PRIOR ART

The ecological impact of disposable diapers and other similar non-woven cellulose articles such as sanitary towels, panties, sick-bed undersheets and other hygiene products creates the need for efficient and economically feasible processes for decompositing the contents of these articles and separating their components for recycling. A child from his birth till the age of 30 months uses approximately 6 disposable diapers a day. Each of the diapers has an average volume of 500 cc. Thus, one child produces an average of about 3000 cc of garbage a day, i.e. 21 liters a week and thus 1.092 cubic meters per year. There are about 50,000 diaper users per million population, so that during one day it is necessary to remove from a city of one million inhabitants 150 cubic m of such garbage.

Different attempts have been made to solve the problem of recycling of disposable diapers, napkins, hospital bed sheets, sanitary towels and other similar products. Practically, all these cellulose-containing articles have an envelope of a non-woven tissue, a plastics or rubber envelope, a cellulose-flock padding filling mixed, in most cases, with superabsorbent polymers which are capable of absorbing liquids up to 400 times their own volume.

The main idea was to recover the cellulose, which is the most valuable raw material and the plastics materials which create an ecological hazard.

Most of the prior art suggests one common process for separating the cellulose from the other materials of the rejected hygiene articles.

The following patents: DE 2704035, EP 91982, SE 8303765, DE 3214294, DE 2703063 describe processes including the following basic operations: disintegration (shredding, cutting) of the disposed articles, followed by separation of the cellulose fibers from the cover materials by screening.

DE 2704035 suggests that the cellulose fibers can be separated from the non-cellulosic materials by dry screening in one or more stages.

Other patents describe the mode of separation of the cellulose from the non-cellulose cover components by means of various machines (such as a perforated drum), applying suction to the drum surface and separating the cellulose mass. These patents describe suction means using ambient air.

U.S. Pat. No. 4,592,115 describes a separator for separation of cellulose fibers, provided with perforations sufficiently large to permit the cellulose fluff fibers to pass therethrough, yet sufficiently small to screen out the larger non-fluff materials from the waste fibrous material. The balance between the tangential air flow rate and the differential pressure across the separator is sufficient to prevent blockage of the apertures in the separator by the waste fibrous material and to achieve the purpose of separation between the cellulose and non-cellulose materials.

Several specific units for recycling of disposable diapers are described in the above mentioned references.

SE 8303765 suggests a pneumotransporter for transporting the diapers onto a cylindrical perforated separator having an upper inlet and two lower outlets for releasing the waste products.

DE 3214294 describes the shredding of the diapers by rotating entrainers, which are arranged in an enclosed housing. The cellulose flock thus separated is removed from the housing under suction through a sieve. The shredded cover material is then removed separately.

EP 0180696 describes an apparatus in which a disintegrated material suspension is introduced tangentially into a separator, comprising a cylindrical housing having one inlet and two outlets. The cellulose separation is achieved by a perforated separation drum and air suction means, provided by a fan.

U.S. Pat. No. 3,807,296 describes an apparatus for disposing of waste materials, wherein the waste materials are separated for either compacting or discharge into a sewage system. Prior to discharge, a portion of the waste products are crushed and stored in a container provided in the apparatus, which container is connected to the sewage system. The remaining portion of the waste materials or the non-decomposable waste material is separated in another compartment from that being crushed, so that it may be compacted and disposed of or forwarded to an appropriate treatment facility for possible recycling. However, recycling of the waste materials is not mentioned in this invention.

U.S. Pat. No. 4,303,501 describes a process for the continuous separation of discarded hygiene articles into their components, namely flock and/or cut absorbent materials on the one hand and sheet coverings on the other, comprising first tearing the discharged hygiene articles into large pieces and then conducting such pieces over an oscillating sieve surface, preferably over an oscillating sieve device having decreasing mesh widths with the smallest mesh width being so selected that the flocculent and/or cut absorbent material still can fall through, while the large pieces of torn coverings are always carried off as sieve residues. It should be noted that no separation and disinfection of the flock stream is provided.

However, the main problem of the cellulose recycling from disposable diapers is not the separation from the elastic or tissue covers, but the separation of the cellulose media from the superabsorbent polymers incorporated in the diaper flock.

All the above described processes are relatively expensive and complicated, because they require installations having sieves, and dependent on compressed and heated air supplies and, therefore, can be utilized only for large-scale "industrial" quantities of diaper garbage.

A further disadvantage of these processes is that the cellulose fibers are not effectively separated from the superabsorbent polymers, which results in the fact, that cellulose recovered by the known methods is incompressible due to the presence of water-containing superabsorbent polymers.

Yet another disadvantage is that the processes described above provide cellulose and also plastics components, which cannot be used as such for further processing.

The apparatus used in the above mentioned processes suffer from corresponding disadvantages of complexity and high cost, and are unsuitable for household use. No safety means are provided to guard the user when charging the used diapers into the processing machine. Moreover, no means are suggested for compacting the disintegrated diaper components and converting them into raw materials for further use.

OBJECTS OF THE INVENTION

It is an object of the present invention to provide a process for recycling cellulose and plastics components of used disposable sanitary non-woven cellulose articles.

Another object of the present invention is to provide two types of apparatus for carrying out such a process, one adapted for recycling of relatively small quantities of the articles and suitable for household use, and the other adapted for continuous large-scale recycling and suitable for hospitals, and the like.

DESCRIPTION OF THE INVENTION

The above objects are achieved by the present invention providing a process for recovering a cellulose flock component of used disposable sanitary non-woven cellulose articles, preferably diapers, having also a plastics component and a superabsorbent polymer component, comprising: separating said cellulose flock component from said plastics component to provide a plastics-containing stream and a cellulose-containing stream; disintegrating said cellulose flock component in water into cellulose fibers, and separating said cellulose fibers from the water and the superabsorbent polymer component and other waste contained therein, by selectively collecting said cellulose fibers onto a rough surface; disposing said superabsorbent polymer component and waste in said water, as effluent; compacting said separated cellulose fibres prior to their discharge, and compacting said separated plastics component prior to discharge thereof.

According to the preferred embodiment of this process, said diapers are sliced into preferably two parts, said parts are gripped by movable gripping means and moistened by repeated dipping in water, with consequent separation of the cellulose flock component containing the superabsorbent polymer component from the plastics component of said diapers and further disintegration of said cellulose flock component in water into said cellulose fibres.

According to one modification of the process according to the invention, said repeated dipping of the split diapers in water is achieved by reciprocal rotation of said split diapers being at least half-immersed in the water, along a predetermined angle range of a horizontal circular trajectory.

More particularly, a plurality of the split diapers are firstly gripped and displaced along said circular trajectory at a low velocity in one sense, then the split diapers are dipped into water by alternately displacing them in the two opposite senses at a high velocity along an angle ranging from 45° to 90°, thereafter the plastics covers are released, displaced at a high velocity in one sense, and tangentially removed by suction for compacting thereof.

It is also recommended to sprinkle by water the sliced diaper plastics covers being plastics component after their separation from the cellulose flock component and prior to their compacting.

According to one embodiment of the process, the separation of the cellulose flock fibers from the superabsorbent polymer component is performed by pouring the water containing the disintegrated cellulose fibers and the waste into a reservoir through a cylindrical screen having a rough inner surface and rotating in said reservoir at a low speed, whereby the cellulose fibers are entrained onto said rough inner surface; the water containing the waste is then flushed from the reservoir and said screen is rotated reciprocally at a higher speed in a predetermined range of angles.

The cellulose fibers collected on the screen are preferably rinsed by sprinkling intermittently with water, or with a solution of a disinfectant.

The cellulose fibers collected on the inner surface of the screen are then scraped off by suitable means and moved upwards to the rim of the screen during its fast rotation, which consequently causes said cellulose fibres to be tangentially discarded therefrom.

In the preferred embodiment of the invention, the above separation stage is preceded by a preliminary separation stage, which comprises collecting the fibers onto a rough surface of a body being at least partially immersed in the water and rotating at low speed about a horizontal axis; then flushing the water comprising the superabsorbent polymers and particles of solid waste, and discarding said cellulose fibers from said rough surface tangentially by rotating the rotatable body at high speed.

In an alternative embodiment of the invention, the cellulose fibers may be collected from the aqueous suspension by immersion of a rotatable brush into the water basin, rotating it there at a low speed, thus collecting the fibers on the bristles of the brush; said brush is then raised from the water basin and rotated faster, thus achieving the centrifugal removal of the fibers from the bristles, together with the water drops, towards a slotted cylindrical surface embracing said raised brush; the cellulose fibers can be then scrapped off from said slotted surface and removed for further compacting.

In accordance with a preferred embodiment of the process according to the invention, the separated cellulose fibers are compacted by compressing them with simultaneous drying.

The compacting of the separated plastics-component can be performed by melting and subsequent cooling. Alternatively, the plastics-component may be compacted by compression and heating at its softening temperature.

Two modifications of the apparatus according to the invention for carrying out the inventive process will be further described by the aid of the attached non-limiting drawings.

BRIEF DESCRIPTION OF THE DRAWINGS

FIG. 2 is a general isometrical view of a family-use machine accomplishing the process according to the invention.

FIGS. 4A and 4B are a vertical and a horizontal cross-sectional views of splitting means of the machine shown in FIG. 2.

FIG. 10 is an enlarged axial cross-sectional view of the feeder and the slicing means of FIG. 9, along line "10—10" in FIG. 9.

DETAILED DESCRIPTION OF THE PREFERRED EMBODIMENTS

Figure 1:
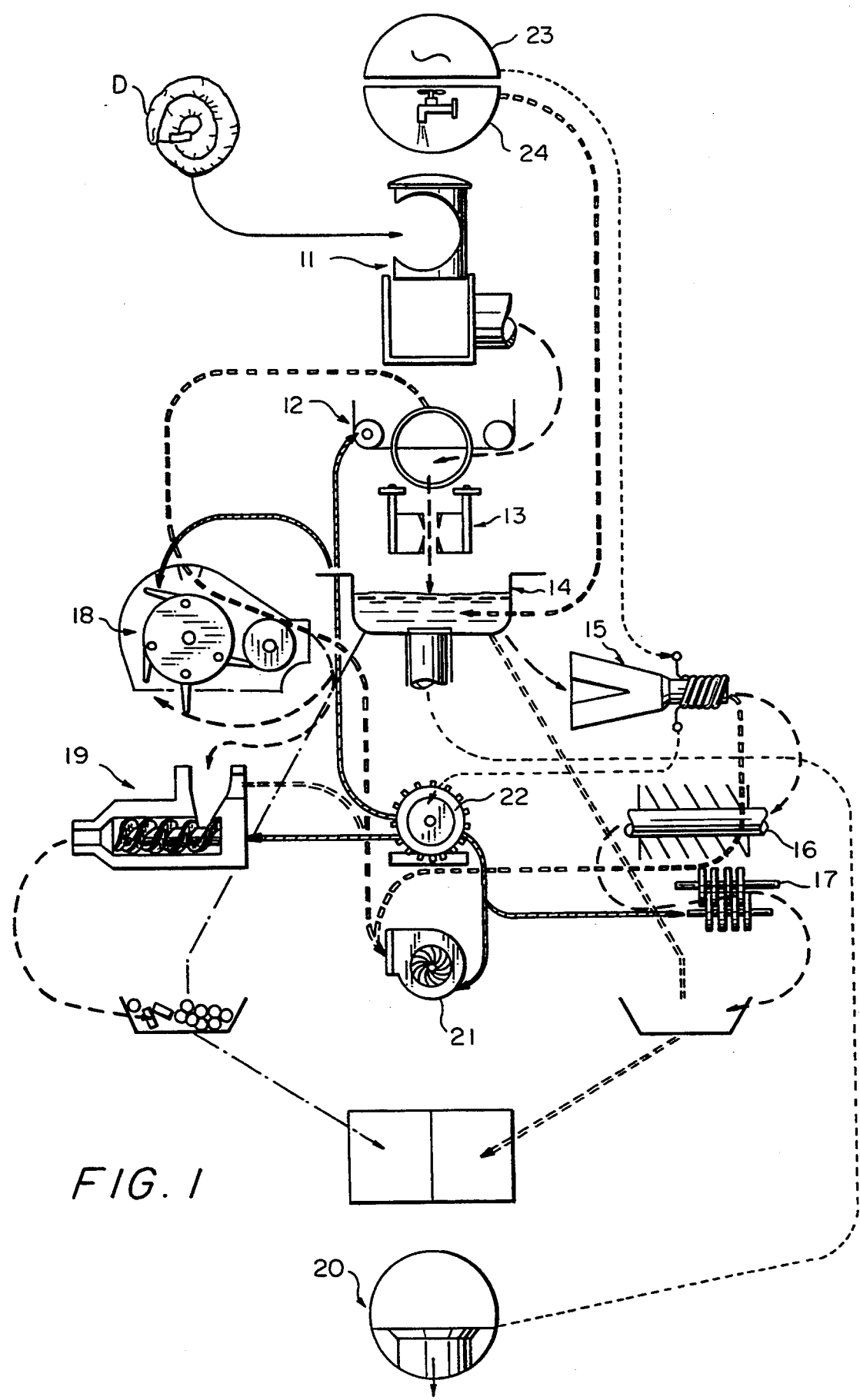
FIG. 1 is a block-diagram of the process according to the invention.

In FIG. 1 one can see the main sequence of operations of the process according to the invention; these operations are performed by components of a family-use machine.

The disposable diaper D or any non-woven cellulose article is introduced into the machine through a safe lid unit 11. Then the diaper is split by a saw illustrated in unit 12. The two parts of the diaper are held by clips 13, which move up and down over the surface of water in a water basin 14, the diaper parts are moistened and separated into two streams: a cellulose and plastic stream. The plastic stream is then removed to a melting element 15 from where the melted plastic is transferred to a cooling unit 16 and then to a discharging and compacting unit 17, which includes a shredding device.

The cellulose stream, separated from the diaper, disintegrates in the water basin 14, where the superabsorbent polymers and waste effluents are carried away by the water; the cellulose flock is collected by a collecting unit 18, which comprises a doffer having a rough surface formed by a hard nap fabric, such as a non-woven abrasive fabric; and the liquid effluent is pumped away from the water basin 14 to the sewage system 20, while fresh water is consequently added into the water basin 14. The moistened cellulose flock, separated in unit 18, is compacted by a compacting unit 19, which comprises a screw and provides compression, disinfection and drying of the cellulose flock before discharging.

A blower 21 is provided to create suction into all the operational units (the blower connections are shown by light cut double lines). The blower may be provided with air purifying means such as an active carbon filter.

An electric motor 22 is provided to drive all the moving parts of all the operational units (the motor connections are shown by thick double lines).

Conventional sources of electricity 23 and water 24 are indicated by their schematic connections.

Dark cut lines show the sequence of the process operations, performed by the specific units. In other embodiments of the process some units could be omitted or differently designed.

Figure 1A:
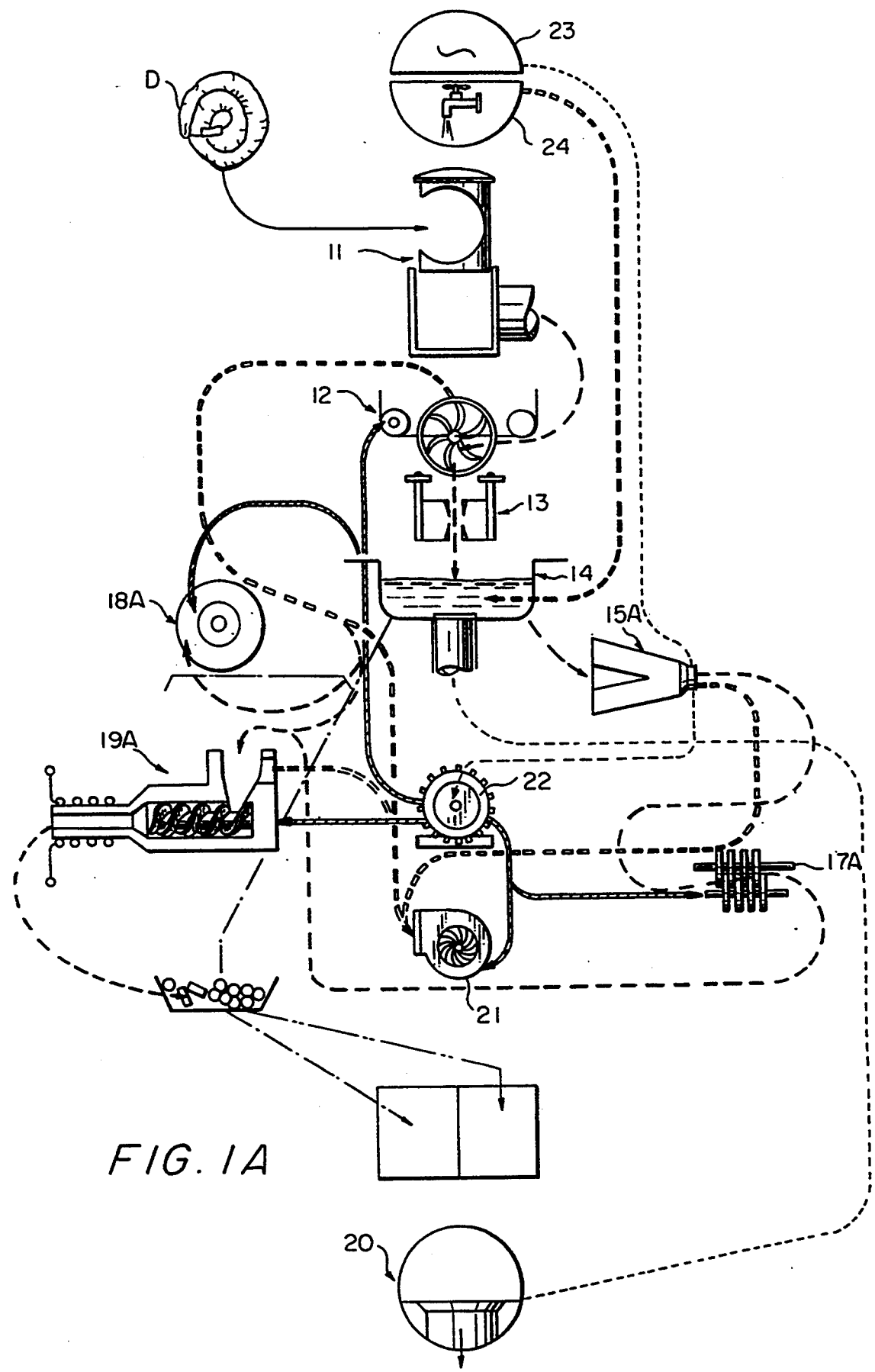
FIG. 1A is a modification of the block-diagram shown in FIG. 1.

In FIG. 1A one can see that several operations of the process in the final step are changed, and some machine components are modified (15A, 18A, 19A) and unified (19A). The plastic stream passes through the conical non-heated receiver 15A and is then shredded by a shredding unit 17A and directed by suction to the compacting unit 19A. The unit 19A is provided with a heating element and is intended to compact and disinfect the cellulose flock and the plastic stream in consequent operations.

In FIG. 2 one can see a general view of the family-use machine, accomplishing the process described above. A safety lid 111, a motor 122, a pedal 133, discharging reservoirs 125 for cellulose and plastic obtained in the separation process, cover housing panels 126 and the main core body 127 including the splitting unit, the plastic and cellulose separating units, the water basin, and the cellulose and plastic compacting units of the machine (not indicated in detail).

Figure 3:
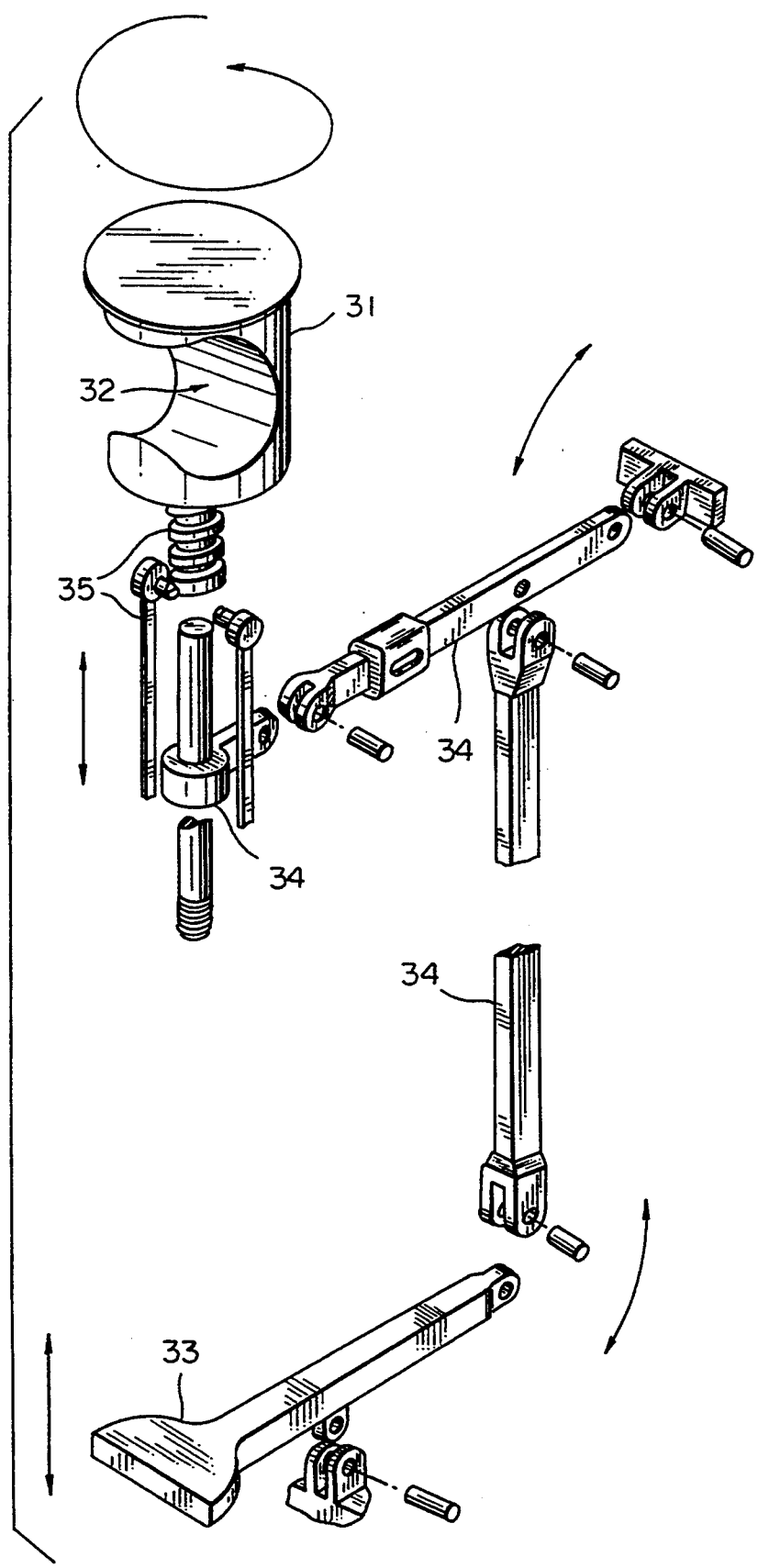
FIG. 3 is an exploded view of a safe lid unit of the machine shown in FIG. 2.

In FIG. 3 the safe lid unit comprises a cylindrical lid 31, having an orifice 32 and the lid 31 is attached to a pedal 33 by a connecting mechanism, which includes raising means 34 and turning means 35. The diaper or any other cellulose article may be introduced into the orifice 32, when the lid 31 is raised by the movable connecting levers of the means 34, applied by the pedal 33. After loading the diaper, the lid 31 turns towards the entry of the splitting unit (not seen) of the machine to unload the diaper and simultaneously the entry orifice 32 is turned by means of the screw 35 to protect the user's hand from any movable parts of the machine.

FIG. 4A illustrates a horizontal cross-sectional view of the slicing unit, and FIG. 4B a vertical cross-sectional view thereof. The slicing unit comprises an endless saw belt 41, rotating around two wheels 42, one of which is driven by a gear wheel 43. The saw belt 41 is located at the outlet position 44 of the lid unit described in FIG. 3 above. A flexible frustoconical guide 45 is intended for transferring the diaper by suction directly towards the saw belt 41. When reaching the saw belt 41, the diaper is sliced and transferred to the movable clips described below in FIG. 5.

Figure 5:
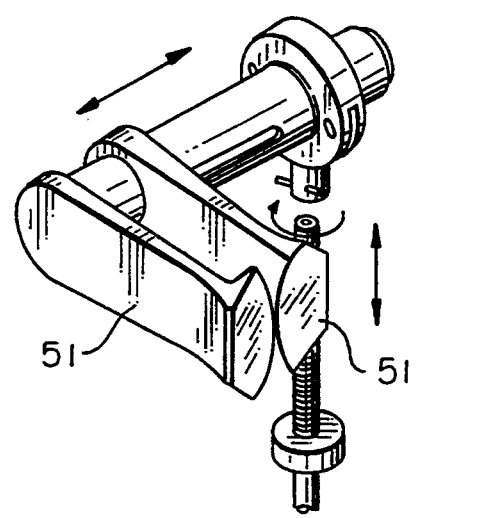
FIG. 5 is a schematical perspective view of a movable clips mechanism of machine shown in FIG. 2.

FIG. 5 illustrates a perspective view of a pair of movable clips 51 of a separation unit. The clips 51 are adapted to perform a horizontal reciprocal "gripping and releasing" movement (along a horizontal arrow), and a vertical reciprocal "dipping" movement (along a vertical arrow). The separation unit includes two opposite pairs of operated movable clips 51, located above a water basin (not seen). When clips 51 grab any part of the diaper split by the saw 41, they start to move up and down thus dipping the split diaper into water, till the cellulose flock becomes moist and separates from the plastics cover of the diaper.

Figure 6:
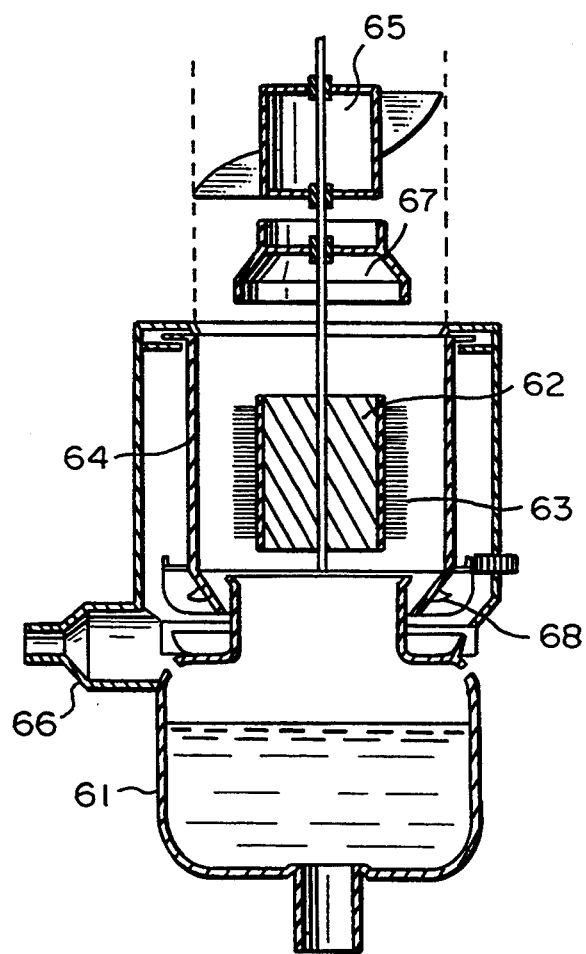
FIG. 6 is a vertical cross-sectional view of a cellulose flock collecting unit of the machine shown in FIG. 2.

FIG. 6 illustrates one embodiment of the collecting unit for gathering cellulose fibers from water suspension. The unit comprises a brush 62 provided with bristles 63 and rotatable at two different speed rates and movable up and down in a water basin 61; and comprises a rotatable coaxial slotted cylinder 64 having a diameter larger than the diameter of the brush 62.

When the brush 62 rotates at the lower speed while being immersed in the water basin 61, the bristles 63 collect the cellulose flock. When the brush 62 is raised from the water basin 61, it is rotated at the faster speed, and the cellulose flock and water drops are centrifuged from the bristle 63 towards the internal surface of the slotted cylinder 64. The water then flows down to the basin 61, and the cellulose flock is scraped off from the internal surface of the slotted cylinder 64 by a scraper 65, mounted coaxially with the brush, and is then transferred out of the unit through a channel 66. A lid 67 is provided to separate the water basin from the scraper 65. The rotatable slotted cylinder 64 can be additionally provided with a blower 68, in order to create suction.

Figure 7:
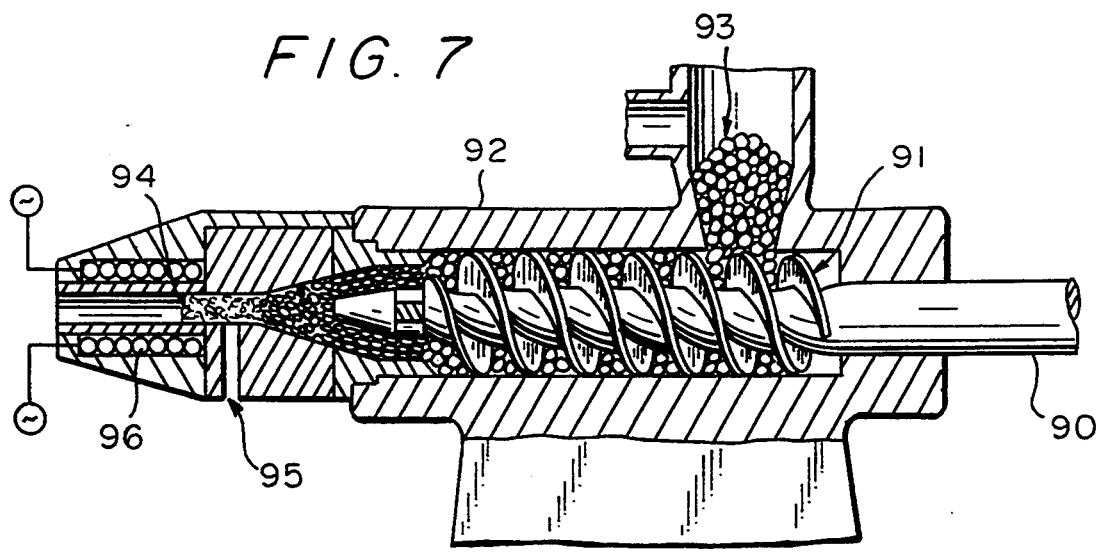
FIG. 7 is a longitudinal cross-sectional view of the cellulose fibers compacting element.

In FIG. 7 the cellulose compacting unit comprises an endsless screw 90, moving in a groove 91 of a housing 92. The housing 92 has a cellulose inlet 93 and a narrow outlet 94, provided by a liquid passage 95. When the cellulose flock is drawn into the inlet 93 by suction, the rotating screw 90 compresses the cellulose flock, thus dries it simultaneously. The housing 92 is provided with an optional heating electrical element 96. Such a heated compacting unit can compress and disinfect the cellulose flock or the plastic cover parts in its outlet channel 95. The mass, situated in the outlet channel 95, which has a diameter of about 25 mm, should be heated in 150° C. for 5 min.

Figure 8:
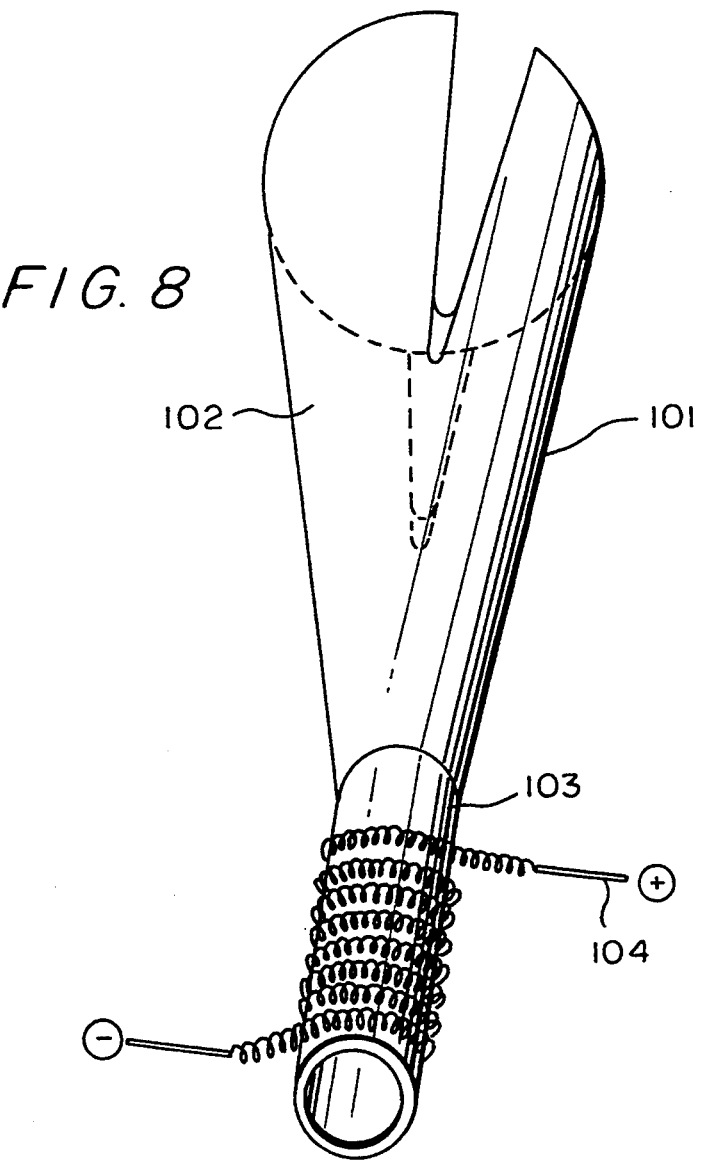
FIG. 8 illustrates a hollowed conical heated element for the processing of the plastic covers of the cellulose articles.

FIG. 8 illustrates the construction of a conical hollowed heated element 101 for processing the plastic stream as it comes off the moving clips (not seen). The element 101 consists of a conical hollowed receiving part 102, attached to a hollowed cylindrical part 103, coiled by a heating electrical element 104. According to the process illustrated in FIG. 1, the plastic cover parts of the disposable diaper or other cellulose articles are accumulated in the conical part 102 and then melted in the cylindrical part 103 as a result of the heating, caused by the heating element 104. The melted plastic mass is transferred to a cooling unit prior discharge. The conical hollowed element, can be modified for the process, illustrated in FIG. 1A, namely it can be manufactured without the heating element 104 and be directly connected by suction to the shredding unit 17A, and then to the cellulose flock compacting heated element 19A (see FIG. 1A).

Figure 9:
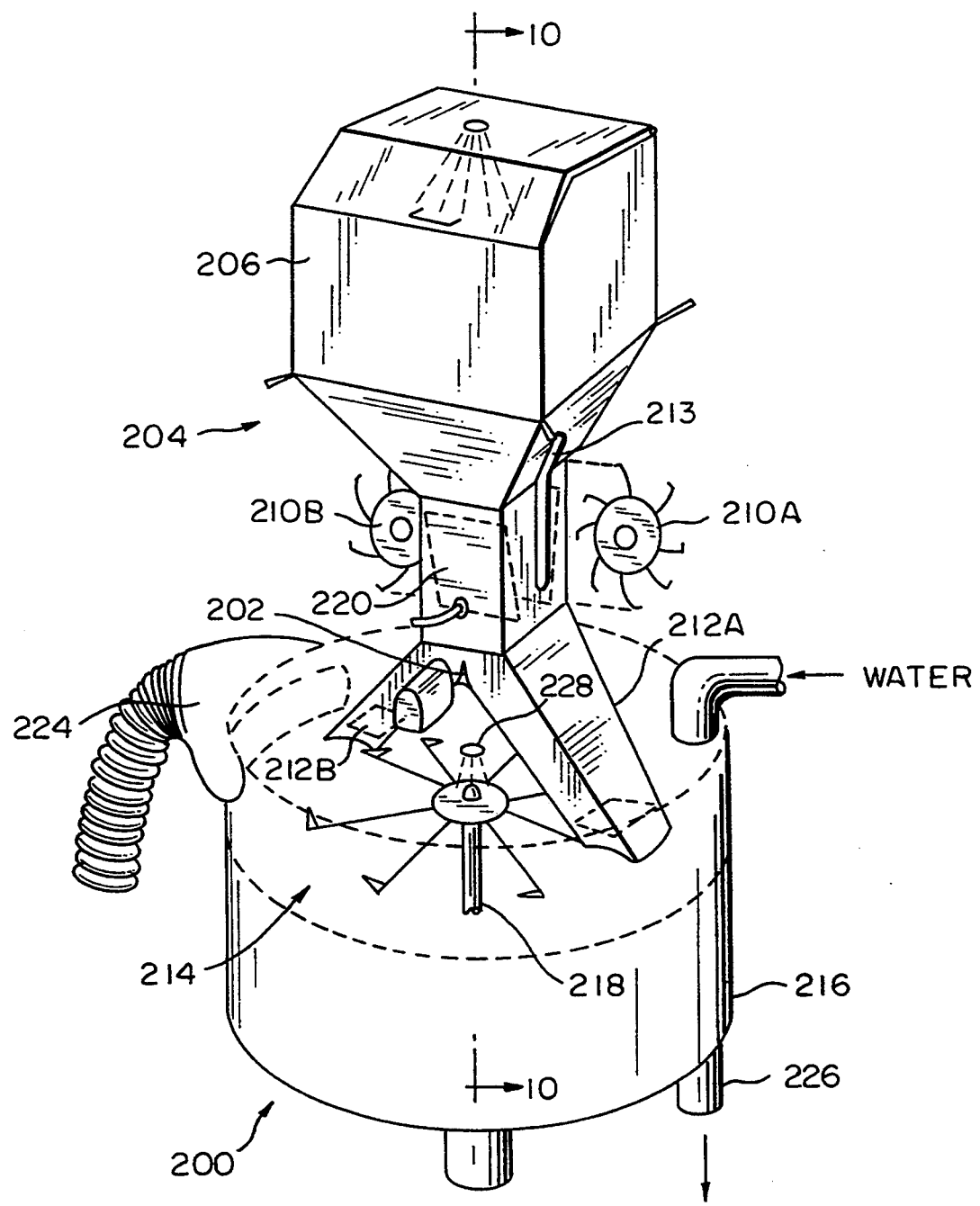
FIG. 9 is a schematical exploded view of a part of a large-scale apparatus according to an embodiment of the invention.

As seen in FIG. 9 the apparatus 200 according to this embodiment of the invention, being specifically adapted for continuous large-scale recycling of disposable sanitary non-woven cellulose articles, particularly diapers, comprises a feeder 204 in the form of a hopper 206 for storing the articles, merging at its lower end into a duct 208 provided with feed advancing means 210A, 210B for delivering the articles to slicing means 202 disposed in duct 208 for splitting the articles before their separation. After passing the slicing means 202, the duct 208 branches into a pair of sleeves 212A, 212B open at their lower ends, and intended for feeding the split articles to a separating unit 214 generally comprising a water basin 216 and a carousel-like member 218 provided with a plurality of radial beams 217 and having the following tasks:

loading thereon the split articles by extracting them from the lower openings of the sleeves 212A, 212B;

moistening the split articles by repeatedely dipping them in the water in basin 216, with consequent separation of the cellulose flock therefrom and disintegration of the flock in the water.

FIG. 10 illustrates in detail the feeder 204 provided with the feed advancing means 209 consisting of a pair of cooperating rollers 210A, 210B having projecting spikes 211 symmetrically mounted at opposite sides of the duct 208 and partially penetrating thereinto through a pair of oppositely located slots 213 (see FIG. 9) provided in the duct 208. The rollers 210A, 210B rotate in opposite senses, so as to push the diapers from the hopper downwards one after the other.

The duct 208 is provided with means 220 for adjusting the cross section of the duct to the size of the diapers transported therethrough in order to center them on the slicing means 202 so as to enable them to be split into two substantially equal parts. The adjusting means 220 may consist, for example, of leave springs in the form of spring biased plates or the like.

The slicing means 202 consists of a pair of closely adjacent parallel blades reciprocally movable in opposite directions. The blades are continuously sprinkled by water from a sprinkler (228 in FIG. 11B) for facilitating the cutting operation. The sleeves 212A, 212B are provided at their lower openings with leave springs 222 for preventing the split diapers from falling out of the sleeves before they are gripped by the radial beams 217 of carousel-like member 218.

Figure 11A:
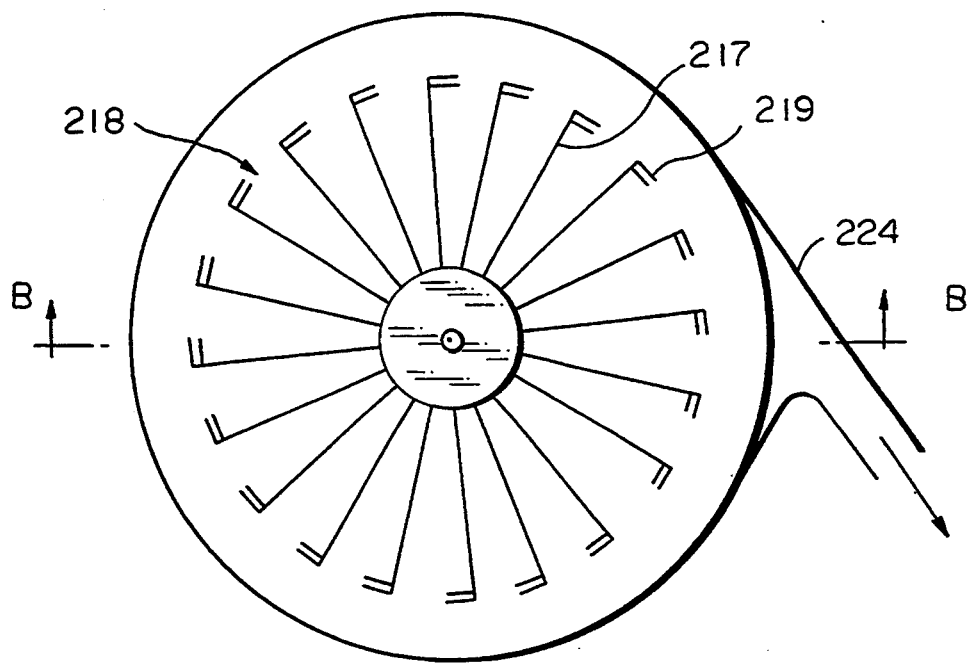
FIG. 11A is a schematic enlarged top view of the separating (dipping) means of FIG. 9.
Figure 11B:
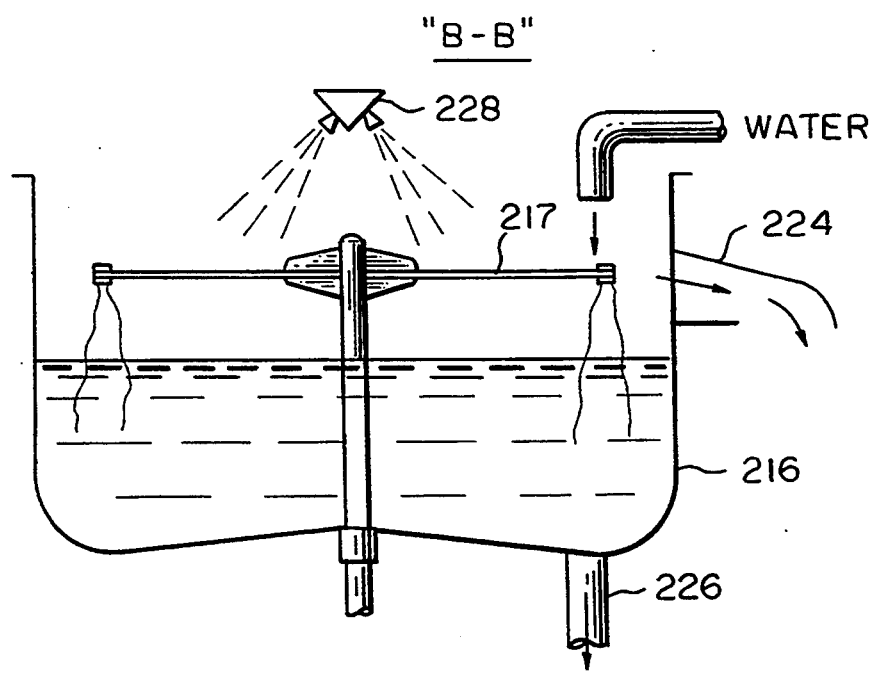
FIG. 11B is a schematic enlarged axial cross-sectional view of the separating (dipping) means of FIG. 9, along line "B—B" in FIG. 11A.

As shown in FIGS. 10, 11A and 11B, the carousel-like rotatable member 218 of the separation means 214 is positioned below the lower openings of the sleeves 212A, 212B and above the water surface in the water basin 216, and is spaced from this surface by a distance less than the minimal dimension of a split diaper. The radial beams 217 of the carousel-like member 218, each provided at its outer end with gripping means 219 (for example, hooks) adapted to continuously extract the split diapers out of the sleeves 212A, 212B during a first, slow mode of rotation of the carousel-like member 218.

The carousel member 218 thus loaded with the split diapers, starts to perform a second, fast mode of reciprocal partial rotations along an angle of, say, about 45°, so as to repeatedly dip the gripped split diapers into the water and moisten them. This consequently causes the cellulose flock to separate from the plastics covers and to drop into the water. The empty plastics covers, which are retained by the gripping means 219, may now be released from the gripping means 110 and discarded into a plastics-containing stream, which may be achieved by means of a third, fast mode of rotation of the carousel-like member 218 with simultaneous suction. For discarding the plastics-containing stream, the water basin 216 is provided with an upper outlet duct 224, located at the level of the radial beams 217 of carousel-like member 218. Before their removal, the plastics covers are rinsed by a water sprinkler 228 positioned above the carousel-like rotatable body 218. It should be noted that a disinfectant solution may be also introduced to the water basin by the sprinkler 228.

A lower outlet duct 226 provided at the bottom of the basin 216 serves for the removal of the aqueous effluent containing the disintegrated cellulose fibers, for its further treatment.

Figure 12:
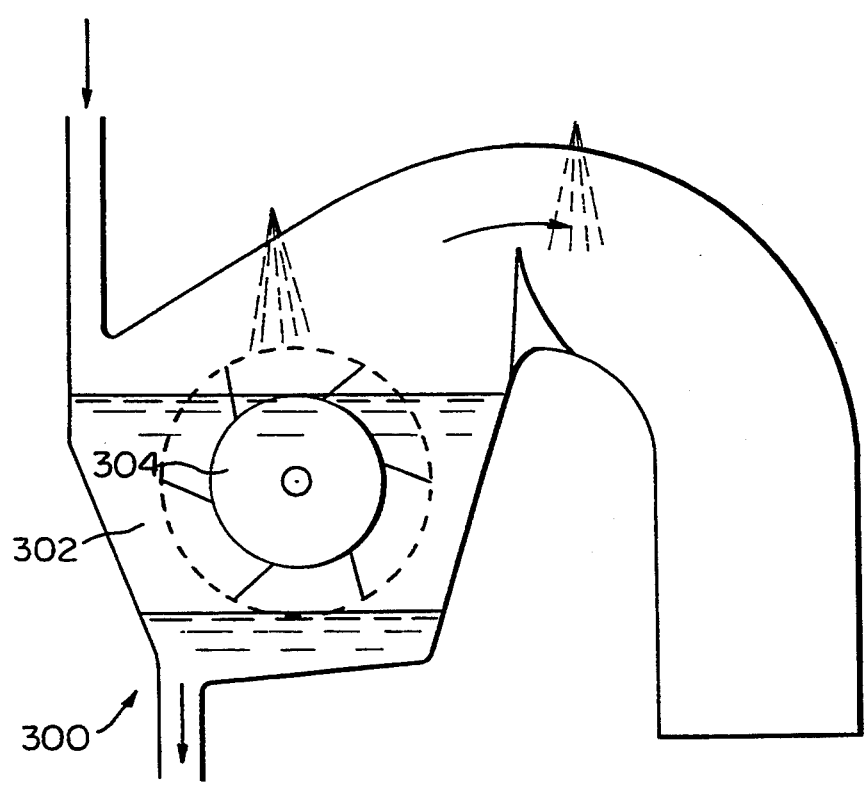
FIG. 12 is a schematic cross-sectional view of an optional preliminary collecting unit for collecting the disintegrated cellulose fibers from water.

An optional preliminary collecting unit 300, which can advantageously be added to the apparatus shown of FIG. 9, is illustrated in cross-section in FIG. 12. The aqueous effluent containing the disintegrated cellulose fibers is conveyed from the basin 216 via the duct 226 (FIG. 9 and 11B) to an intermediate water container 302, housing a rotational body 304 having a rough surface (for example, a brush) and being partially immersed in the water. The body 304 is rotatable about a horizontal axis at two different speeds: a slower mode of rotation during which the cellulose fibers are collected from the water onto the bristles of the brush 304, and a faster mode of rotation of the brush 304 during which the collected fibers are tangentially discarded therefrom. The latter operation is performed after the aqueous effluent, depleted of the fibers, has already been flushed out of the container 302, thereby removing from the cellulose flock the solid waste particles and some amount of the superabsorbent polymer gel contained in the effluent.

Figure 13A:
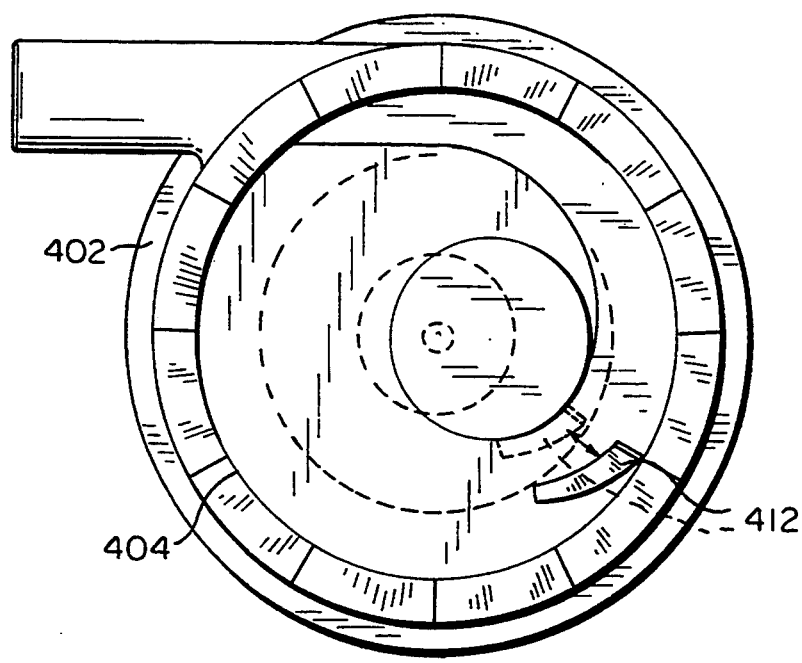
FIG. 13A is a schematic horizontal cross-sectional view, of the main collecting means which may be combined with the apparatus of FIG. 9.
Figure 13B:
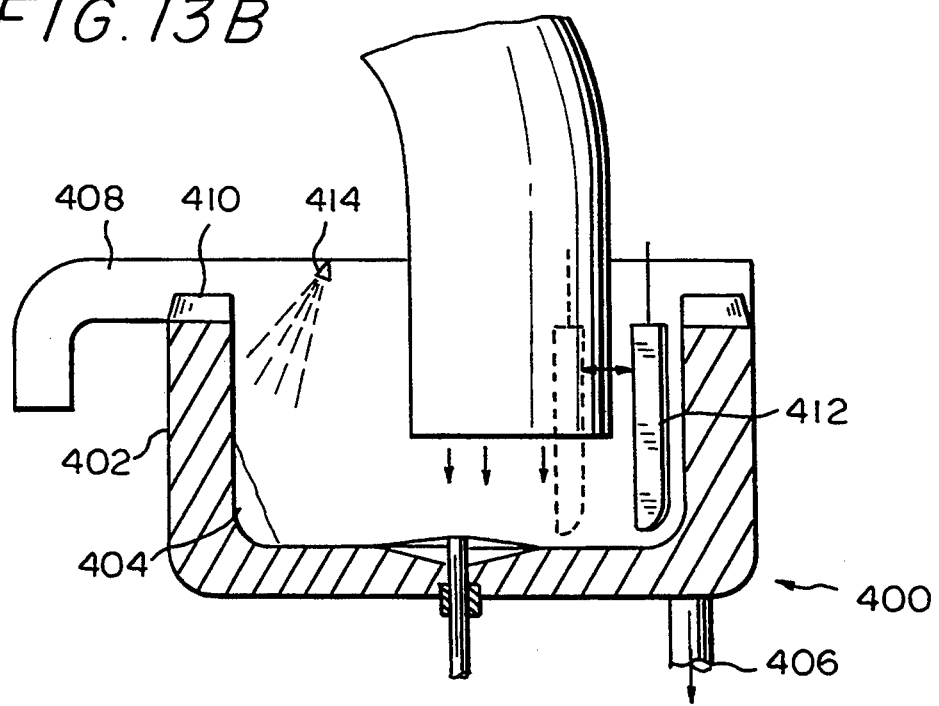
FIG. 13B is a schematic axial cross-sectional view of the main collecting means which can be incorporated with the apparatus of FIG. 9.

The wet cellulose fibers, after being discarded from the bristles of the brush 304, are transferred to the main collecting means shown in FIG. 13A, 13B.

As seen in FIGS. 13A and 13B, the main collecting means 400 of the apparatus of FIG. 9. comprises a cylindrical reservoir 402 provided with an internal rotatable cylindrical screen 404, both located below and coaxially with the water basin 216 containing the carousel-like member 218 (FIG. 11B). The reservoir 402 is provided with a lower outlet pipe 406 and an upper tangential outlet pipe 408 positioned at the level of the upper edge of the screen 404. The screen 404 serves either for receiving the wet cellulose fibers, together with some of the superabsorbent polymer component which is still retained thereon, from the optional intermediate collecting means 300 or (in the absence of such intermediate collecting means) for receiving the aqueous effluent containing the disintegrated cellulose fibers directly from the water basin 216. The screen 404 has a rough inner surface and is reciprocally rotatable in opposite senses along various angles and at various velocities according to a predetermined regime. During a first, slow mode of rotation of the screen 404, its vertical wall collects on its inner rough surface the cellulose fibres from their suspension in water. The cylindrical screen 404 has an outwardly flared upper edge 410 and is further equipped with a curved scraper 412 adapted to scrape off the fibers from the rough inner surface of the vertical screen wall, during a second, fast mode of rotation of the screen 404, and to displace the collected cellulose fibers upwards along the inner screen wall to its flared upper edge 410 from which the fibers are removed by suction via the tangential outlet pipe 408 and then transported to subsequent drying and compacting stations.

A water sprinkler 412 is positioned above the screen 404 for intermittent washing of the cellulose fibers collected on its internal rough surface.

We claim:

1. A process for recovering a cellulose flock component of used disposable sanitary non-woven cellulose articles, having also a plastics component and a superabsorbent polymer component, comprising:

separating said cellulose flock component from said plastics component to provide a plastics-containing stream and a cellulose-containing stream;

disintegrating said cellulose flock component in water into cellulose fibers, and separating said cellulose fibers from the water and the superabsorbent polymer component and other waste contained therein, by selectively collecting said cellulose fibers onto a rough surface;

disposing said superabsorbent polymer component and waste in said water, as effluent;

compacting said separated cellulose fibers prior to their discharge, and compacting said separated plastics component prior to discharge thereof.

2. The process according to claim 1, wherein said disposable sanitary non-woven cellulose articles are diapers.

3. The process according to claim 1, wherein said articles are sliced into preferably two parts, said parts are gripped by movable gripping means and moistened by repeated dipping in water, with consequent separation of the cellulose flock component containing the superabsorbent polymer component from the plastics component of said diapers and further disintegration of said cellulose flock component in water into said cellulose fibres.

4. The process of claim 3, wherein said repeated dipping of the split articles in water is achieved by reciprocal rotation of said split diapers being at least half-immersed in the water, along a predetermined angle range of a horizontal circular trajectory.

5. The process according to claim 4, wherein a plurality of the split articles are firstly gripped and displaced along said circular trajectory at a low velocity in one sense, then the split diapers are dipped into water by alternately displacing them in opposite senses at a high velocity along an angle ranging from 45° to 90°, thereafter the plastics covers are released, displaced at a high velocity in one sense, and tangentially removed by suction for compacting thereof.

6. The process according to claim 1, wherein said compacting of said separated cellulose fibers comprises compressing and simultaneous drying and disinfection of said fibers by heating thereof.

7. The process according to claim 1, wherein said plastic component is compacted by melting and subsequent cooling.

8. The process according to claim 1, wherein said plastic component is compacted by compressing and heating at its softening temperature.

9. Apparatus for recovering a cellulose flock component of used disposable sanitary non-woven cellulose articles having also a plastics component and a superabsorbent polymer component, said apparatus comprising:

separation means for separating said cellulose flock component containing said superabsorbent polymer component, from said plastics component;

disintegration means comprising a water basin, for disintegrating the thus separated cellulose flock component into cellulose fibers, superabsorbent polymer gel and waste, and dispersing said fibers in water;

collecting means including an element having a rough surface for selectively collecting thereon said cellulose fibers from their aqueous dispersion;

compacting means for compacting said cellulose fibers collected by said collecting means;

compacting means for compacting said plastics component, and disposal means for removal of the water containing said superabsorbent polymer gel and waste from said water basin.

10. Apparatus in accordance with claim 9, specifically adapted for small-scale recycling of used sanitary non-woven cellulose articles, comprising a safety lid for introducing said cellulose articles into the apparatus, in order to protect the user's hand from any movable parts, and slicing means for slicing said articles upstream of said separating means.

11. Apparatus according to claim 10, wherein said safety lid comprises a cylindrical body having an orifice through which said cellulose articles are introduced; which cylindrical body is attached to a pedal by connecting, raising and turning means for causing said lid to rise so as to permit introduction of the cellulose article into said orifice, whereafter the lid is retracted into the apparatus and rotated simultaneously.

12. Apparatus in accordance with claim 10, wherein said slicing means are placed under said lid and comprise an endless saw belt and a flexible frusto-conical guide tube for transferring said diapers from said lid towards said saw belt, said guide tubes having a smaller orifice and a larger orifice wherein said smaller orifice faces towards said saw belt.

13. Apparatus in accordance with claim 9, wherein said separation means comprise movable clips for gripping the plastic cover parts of said cellulose articles; dipping them into water and transferring the plastics covers after separation thereof from the cellulose component, to further compacting and discharging.

14. Apparatus according to claim 9, wherein said cellulose flock collecting unit comprises a rotatable cylindrical brush; a coaxial slotted cylinder embracing said brush; and scraping means; said brush being adapted for immersion and rotation in said water basin for gathering said cellulose fibers from the water onto bristles of said brush; said brush being raisable from said water basin for further unloading said cellulose fibers therefrom.

15. Apparatus according to claim 14, wherein said brush is able to rotate at two different rates; and said coaxial slotted cylinder has a diameter larger than the diameter of said brush; so that when said brush rotates slowly while being immersed in said water basin, said bristles collect said cellulose fibers from said water; and when said brush is raised from said water basin and is rotated faster, said cellulose fibers together with the water drops are centrifuged away from said bristles towards the internal surface of said slotted cylinder; from which they are subsequently scraped off by said scraping means.

16. Apparatus in accordance with claim 15, wherein said scraping means are in the form of an additional coaxial cylinder adapted to be introduced and rotated in said slotted cylinder, and being provided on its side surface with a curved flexible strip adapted to be pressed towards the inner surface of said slotted cylinder.

17. Apparatus according to claim 9, wherein said compacting means of said cellulose fibers comprises a rotatable screw feeder means for compacting said cellulose fibers and creating an elevated temperature thus providing disinfection and drying of said cellulose flock; said rotatable screw feeder is additionally provided with heating means.

18. Apparatus according to claim 9, further comprising a blower means for creating suction for pneumatically transferring of said cellulose articles and their components from one of said units to another, said blower being provided with air purifying means.

19. Apparatus in accordance with claim 9, specifically adapted for continuous large-scale recycling of used disposable sanitary non-woven cellulose articles discarded from medical, educational and wellfare institutions, further comprising a slicing means for splitting said articles into two parts before their separation in said separation means, and a feeder for continuously passing said cellulose articles through said slicing means.

20. Apparatus in accordance with claim 19, wherein said slicing means comprises a pair of closely adjacent parallel movable blades adapted to perform reciprocative movements in opposite directions and continuously sprinkled by water.

21. Apparatus in accordance with claim 19, wherein said separation means comprises a carousel-like, horizontally rotatable member positioned beneath the lower openings of said sleeves and above the water surface in said water basin, and being spaced from the water surface by a distance less than the minimal length of a split article; said carousel-like member being reciprocatively rotatable along various angles and at various velocities according to predetermined regimes, and comprises a plurality of radial beams each provided at its outer end with gripping means adapted to extract the split articles from said sleeves when said carousel member is rotated in one of the predetermined regimes; and said water basin being provided with a first outlet duct at the level of said carousel-like member for removal therefrom of the plastics covers of said split articles, and a second outlet duct for removing from said water basin the water together with the effluent and the cellulose fibers disintegrated therein to said collecting means.

22. Apparatus in accordance with claim 19, wherein said feeder comprises a hopper for storing the diapers, merging at its lower end into a duct provided with feed advancing means, and leading to said slicing means; said duct thereafter branching into a pair of sleeves open at their lower ends for feeding the split articles to said separating means.

23. Apparatus in accordance with claim 22, wherein said feed advancing means consists of a pair of cooperating adjacent rollers mounted in said duct side by side and rotating in opposite senses, so as to push said articles downwards one after another.

24. Apparatus in accordance with claim 22, wherein said duct is provided with means for adjusting its cross section to the size of the articles being transported therethrough, in order to center said articles on said slicing means so as to enable them to be split into two substantially equal parts.

25. Apparatus in accordance with claim 22, wherein said sleeves are provided at their lower openings with leave springs for preventing said split articles from falling out of said sleeves.

26. The apparatus according to claim 9, wherein the collecting means comprise a cylindrical reservoir provided with a coaxial internal cylindrical screen, having a rough internal surface, reciprocally rotatable in opposite senses along various angles and at various velocities according to predetermined regimes; said cylindrical screen serving for collecting on its rough internal surface the disintegrated cellulose fibers from the water, which contains them together with the superabsorbent polymer, during slow rotation of said screen; said reservoir being provided with a lower outlet pipe for removing the aqueous effluent to a sewer, and an upper tangential outlet pipe positioned at the level of the upper edge of said screen which is outwardly flared; said apparatus being further equipped with a curved scraper adapted to scrape off the collected cellulose fibers from the rough internal surface of said cylindrical screen toward its flared upper edge during fast rotation of the screen, for removal of the fibers by suction via said tangential pipe.

27. The apparatus in accordance with claim 26, further provided with at least one water sprinkler positioned above said cylindrical sieve for intermittent washing the cellulose fibres collected on the rough surface of said screen.

28. Apparatus according to claim 26, preceded by a preliminary collecting unit comprising a container with water containing said disintegrated cellulose fibers and the effluent, said container being provided with a body having a rough surface and being at least partially immersed in the water, said body being rotatable at two different speeds about a horizontal axis, so as to either collect said cellulose fibers from the water onto said rough surface during a slower rotation of said body, or to tangentially discard the collected fibers therefrom during a faster rotation of the body, after the water with the effluent has already been flushed from the container.

29. The apparatus in accordance with claim 9, further provided with means adapted to apply a lowered air pressure at all inlet and outlet openings of the apparatus in order to prevent escape of unpleasant odours therefrom.

30. The apparatus in accordance with claim 29, further provided with water sprinkling means positioned above said carousel-like rotatable body and adapted for injecting either water or disinfectant solution.

* * * * *